I. J. KIDD.
Corn Planter.
No. 81,911. Patented Sept. 8, 1868.
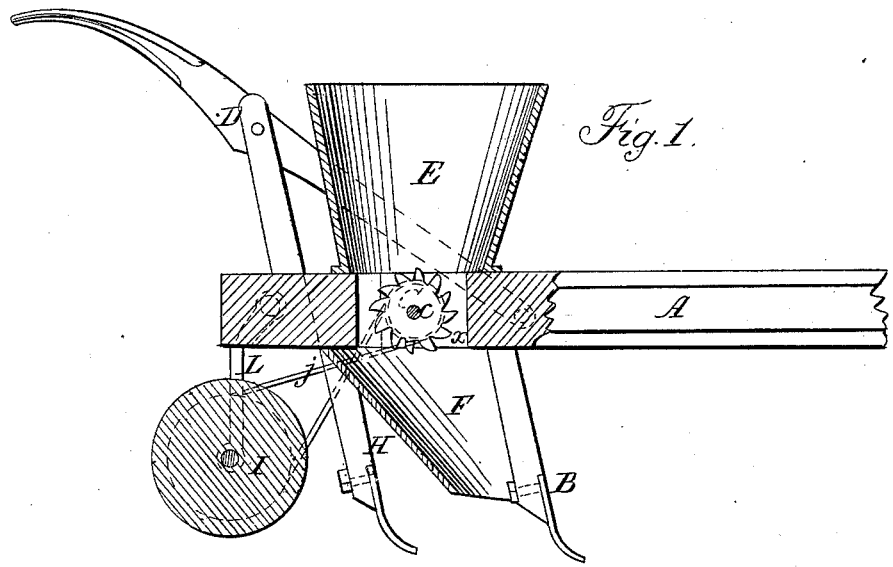
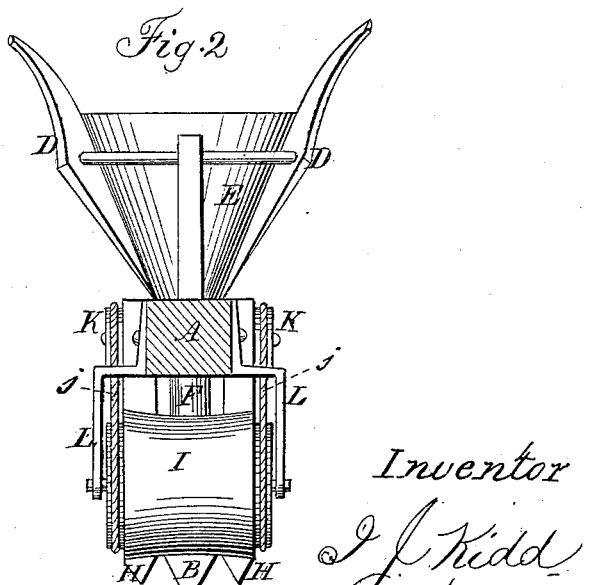

United States Patent Office.

I. J. KIDD, OF YOUNG SETTLEMENT, TEXAS.

Letters Patent No. 81,911, dated September 8, 1868; antedated August 28, 1868.

IMPROVEMENT IN CORN-PLANTERS.

*The Schedule referred to in these Letters Patent and making part of the same.*

TO ALL WHOM IT MAY CONCERN:

Be it known that I, I. J. KIDD, of Young Settlement, in the county of Bastrop, and in the State of Texas, have invented certain new and useful Improvements in Corn-Planters; and do hereby declare that the following is a full, clear, and exact description thereof, reference being had to the accompanying drawings, and the letters of reference marked thereon.

In the annexed drawings, making a part of this specification, A represents a plow-beam, or a beam of similar construction to a plow-beam, and D represents the handles thereto. The handles D are secured to the beam in any convenient or ordinary manner.

B represents an ordinary shovel-plow, adjusted to or in the beam, in any manner desired. The beam A is provided with a slot, $x$, passing through the middle thereof, just behind the plow B, in which is adjusted on a suitable spindle or shaft, a circular feed-wheel, $c$. Said wheel $c$ is made so as to fit exactly in said slot $x$, and is provided with one or more notches or grooves across the face, in which the grains of corn fall, and are carried down through the slot, and then, through a suitable spout, F, into the furrow behind the plow B. For planting cotton, the wheel $c$ is made with notches or teeth similar to saw-teeth, as shown in the drawings.

E represents a box or hopper, secured above the wheel $c$ to the beam A and handles D, and may be of any size desired.

Behind the spout F, and secured to the beam A at a suitable distance apart, are small plows or teeth H H, which serve to cover the grain or seed in the furrow between them. Adjusted between suitable arms L L, and behind the plows H H, is a roller, I, which is made concave, as shown, and having pulleys secured to each end thereof. The pulleys attached to or formed on the ends of the roller I, act as drive-wheels for the feed-wheel $c$. The spindle or shaft upon which the wheel $c$ is adjusted has small pulleys K K, secured at the ends of it, over which works the cord or band $j$. The bands $j$ pass around the pulleys on the ends of the roller I, and thence around the pulleys K K, and drive or give motion to the wheel $c$. The comparative size of the pulleys K K, with those on the roller, will regulate the feed of the grain or seed by the feed-wheel $c$, and may be made adjustable to suit the different kinds of seed to be planted, or the distance required between the hills of the grain.

Having thus fully described my invention, what I claim as new, and desire to secure by Letters Patent, is—

The arrangement of the feed-wheel $c$, pulleys K K, plow-beam B, cords or bands $j\,j$, roller I, spout F, and plows B and H H, the several parts being constructed and operated substantially as and for the purpose specified.

In testimony that I claim the foregoing, I have hereunto set my hand and seal, this   day of     ,1867.

I. J. KIDD. [L. S.]

Witnesses:
  JOHN R. COOK,
  SETH W. BIGGS.